United States Patent [19]
Shaw et al.

[11] Patent Number: 5,216,862
[45] Date of Patent: * Jun. 8, 1993

[54] CONCRETE DOWEL PLACEMENT SLEEVES

[76] Inventors: Ronald D. Shaw, 1988 Pelican, Costa Mesa, Calif. 92626; Lee A. Shaw, 1924 Irvine Ave., Newport Beach, Calif. 92660; Leroy E. Shaw, 2861 Tobago Pl., Costa Mesa, Calif. 92626

[*] Notice: The portion of the term of this patent subsequent to Apr. 9, 2008 has been disclaimed.

[21] Appl. No.: 656,250

[22] Filed: Feb. 15, 1991

Related U.S. Application Data

[63] Continuation-in-part of Ser. No. 508,080, Apr. 10, 1990, Pat. No. 5,005,331, which is a continuation of Ser. No. 263,556, Oct. 27, 1988, abandoned.

[51] Int. Cl.$^5$ .............................................. E04B 1/62
[52] U.S. Cl. ....................................... 52/396; 52/704
[58] Field of Search ................. 52/699, 700, 701, 704, 52/677, 396; 404/60, 50–51, 74; 249/2, 3, 6, 9; 264/33–35, 251, 256, 275

[56] References Cited

U.S. PATENT DOCUMENTS

| | | | |
|---|---|---|---|
| 1,045,562 | 11/1912 | Kennedy | 52/699 |
| 2,636,426 | 4/1953 | Heltzel | 249/9 |
| 2,746,365 | 5/1956 | Darneille | 249/9 |
| 4,533,112 | 8/1985 | Santos, Jr. et al. | 249/3 |
| 4,578,916 | 4/1986 | Witschi | 52/396 |
| 5,005,331 | 4/1991 | Shaw et al. | 52/396 |

FOREIGN PATENT DOCUMENTS 1094449  11/1953  France ................................. 52/700

OTHER PUBLICATIONS

Brochure by *Concrete Tie* for continuous dowel support and spacer for expansion joints in concrete pavements.

*Primary Examiner*—Carl D. Friedman
*Assistant Examiner*—Michele A. Van Patten
*Attorney, Agent, or Firm*—Stetina and Brunda

[57] ABSTRACT

Slip and non-slip dowel placement sleeves are disclosed. The slip dowel placement sleeve generally comprises a tubular dowel receiving sheath having a closed distal end and open proximal end. A connecting means is formed around or inserted into the proximal opening of the sheath to facilitate attachment of the sheath to a concrete form. Smooth sections of dowel rod may then be advanced through holes drilled in the concrete form and into the interior compartment of the sheath. Concrete is poured within the form and the dowel rod remains slidably disposed within the interior of the sheath. Variations of the basic slip dowel placement sleeve of the invention include a tapered "extractable" sleeve and a corrugated "grout tube" for placement of non-slip dowel or rebar.

35 Claims, 3 Drawing Sheets

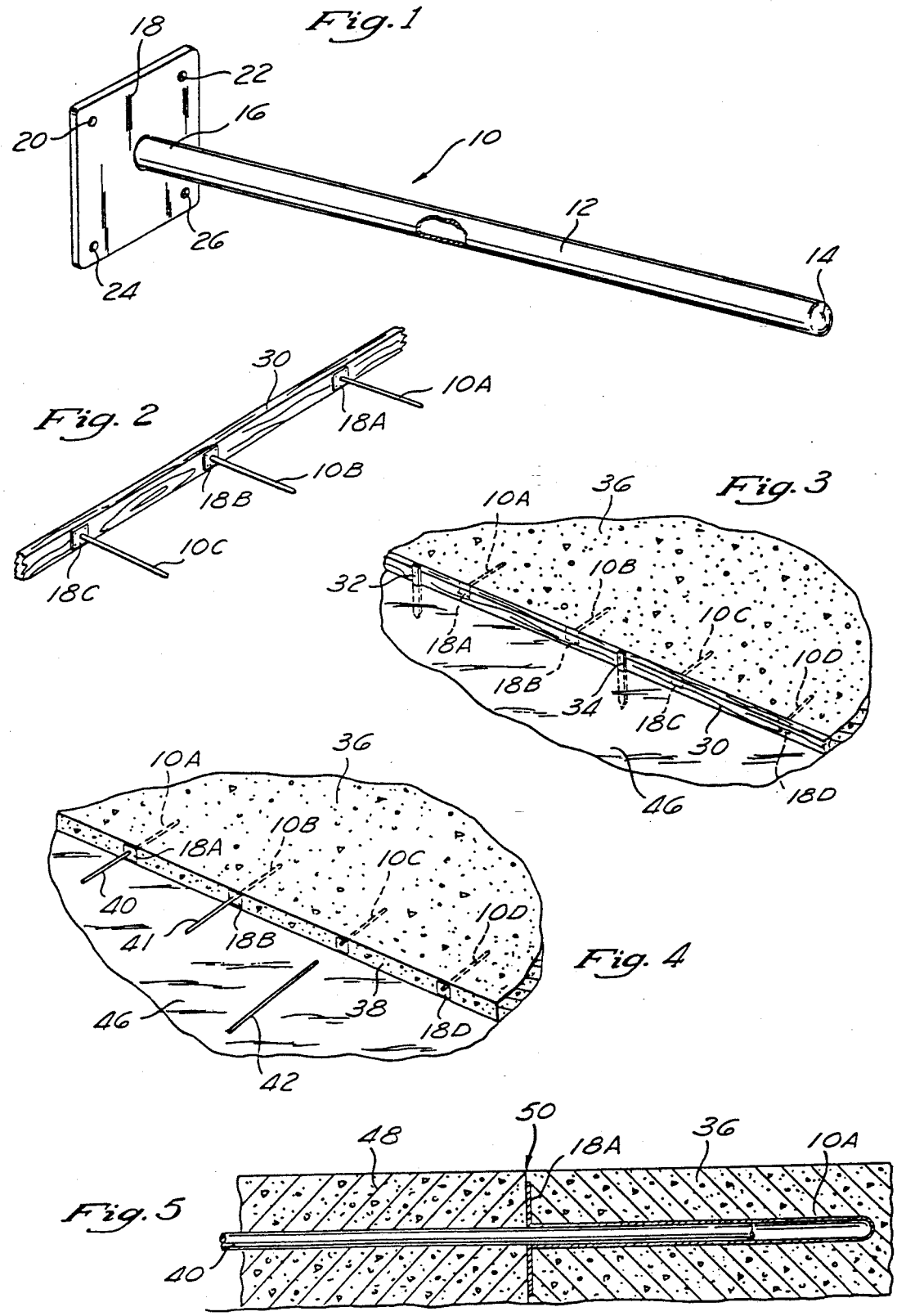

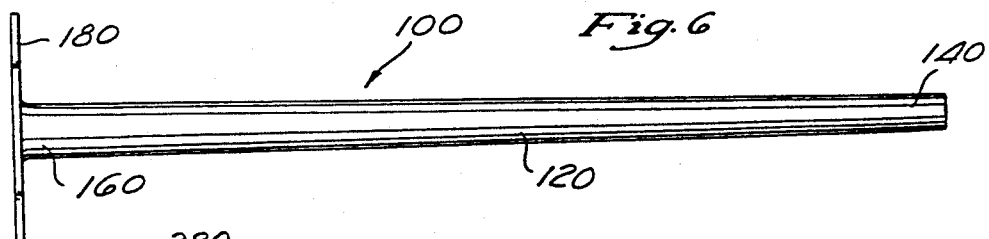
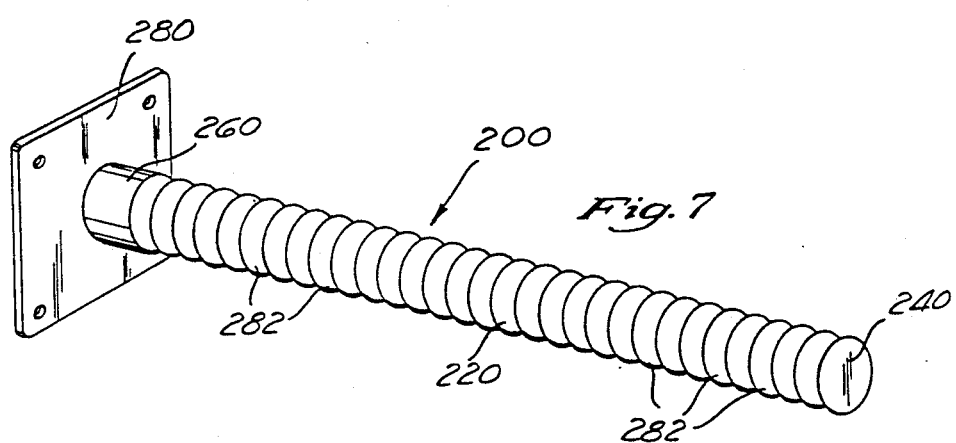
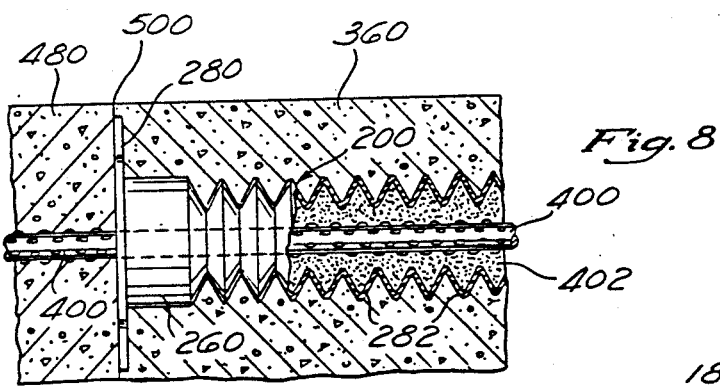
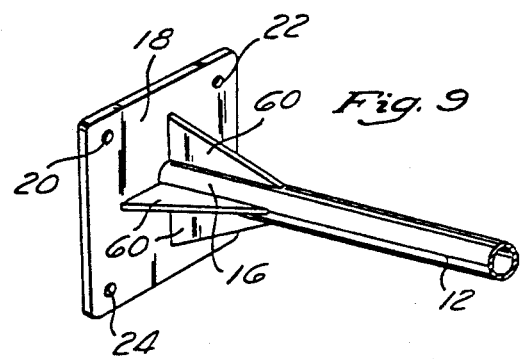

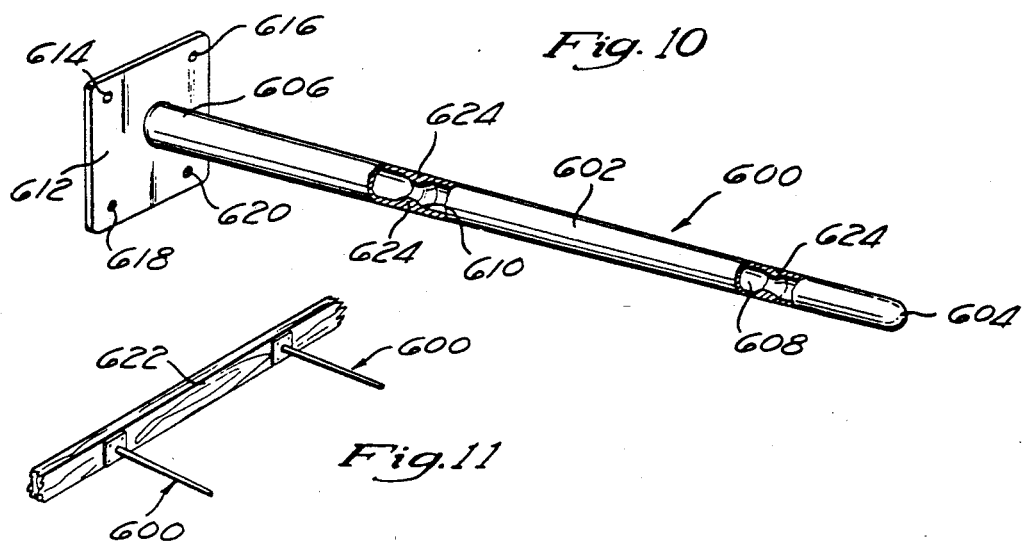
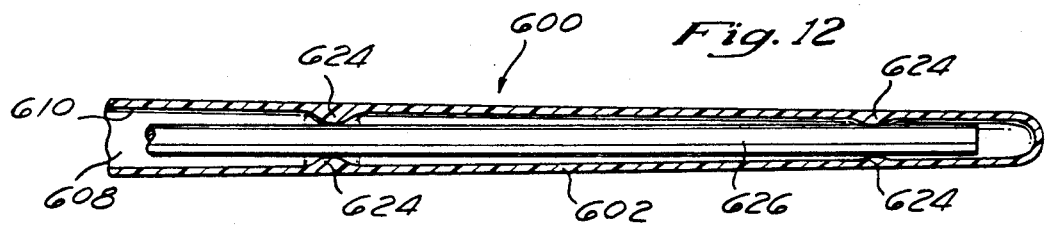
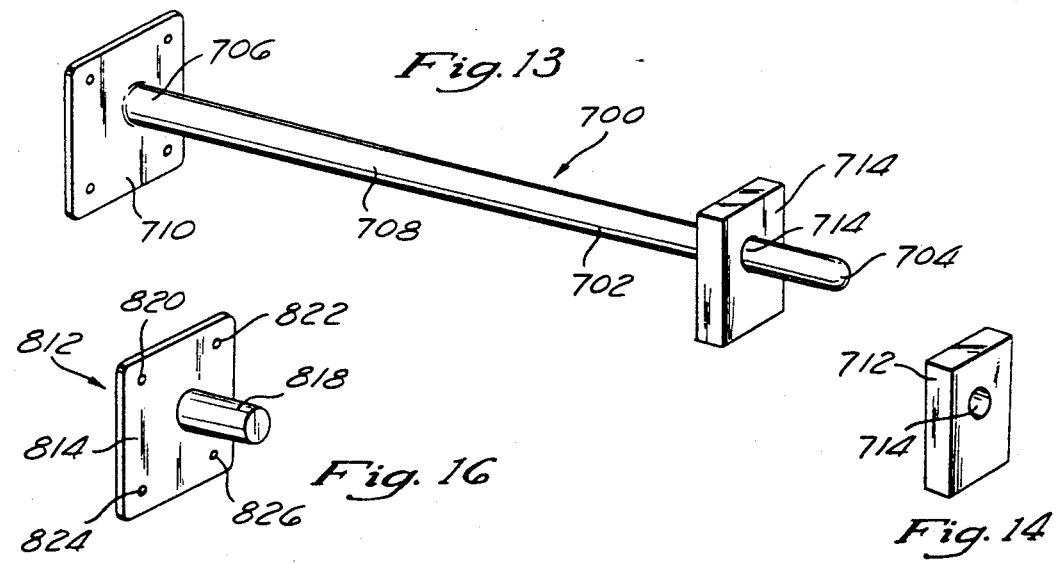
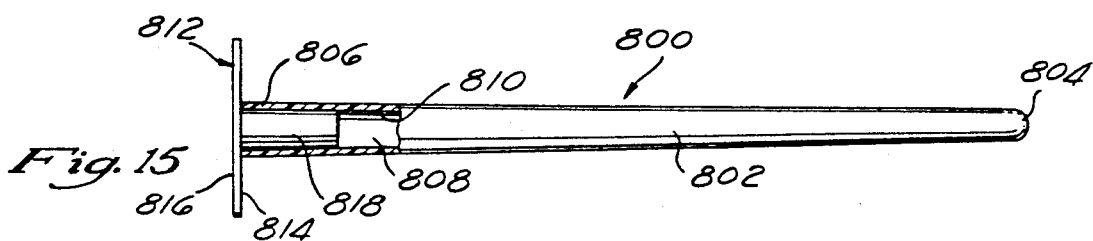

CONCRETE DOWEL PLACEMENT SLEEVES

FIELD OF THE INVENTION

The present application is a continuation-in-part of application Ser. No. 07/508,080, filed Apr. 10, 1990 now U.S. Pat. No. 5,005,331 issued Apr. 9, 1991, which is a continuation of application Ser. No. 07/263,556, filed Oct. 27, 1988 now abandoned. The invention pertains generally to the art of concrete construction and more particularly to devices for facilitating placement of slip and/or non-slip dowel rods within adjacent concrete slabs.

BACKGROUND OF THE INVENTION

In the art of concrete construction, it is commonplace to form "cold joints" between two or more poured concrete slabs. Such cold joints frequently become uneven or buckled due to normal thermal expansion and contraction of the concrete and/or compaction of the underlying soil caused by inadequate substrate preparation prior to pouring of the concrete. As a means of preventing buckling or angular displacement of such cold joints, it is common practice to insert smooth steel dowel rods generally known as "slip dowels" within the edge portions of adjoining concrete slabs in such a manner that the concrete slabs may slide freely along one or more of the slip dowels, thereby permitting linear expansion and contraction of the slabs while at the same time maintaining the slabs in a common plane and thus preventing undesirable buckling or unevenness of the cold joint.

In order to function effectively, slip dowels must be accurately positioned parallel within the adjoining concrete slabs. If the dowels are non-parallel positioned, such will prevent the desired slippage of the dowels and will defeat the purpose of the "slip dowel" application. Additionally, the individual dowels must be placed within one or both of the slabs in such a manner as to permit continual slippage or movement of the dowel within the cured concrete slab(s).

In the prior art, two methods of installing smooth "slip dowels" have become popular. According to the first method, a first concrete pour is made within a pre-existing form. After the first pour has cured, an edge of the form (usually wooden stud) is stripped away. A series of holes are then drilled parallel into the first pour along the exposed edge from which the form has been removed. The depth and diameter of the individual holes varies depending on the application and the relative size of the concrete slabs to be supported. As a general rule, however, such holes are at least 12" deep and typically have a diameter of approximately ⅝ of an inch.

After the parallel aligned series of holes has been drilled into the first pour, smooth dowel rods are advanced into each such hole such that one end of each dowel rod is positioned within the first pour and the remainder of each dowel rod extends into a neighboring area where a second slab of concrete is to be poured. Thereafter, concrete is poured into such neighboring area and is permitted to set with the parallel aligned dowels extending thereinto. After the second pour has set, the slip dowels will be held firmly within the second slab but will be permitted to slide longitudinally within the drilled holes of the first slab thereby accommodating longitudinal expansion and contraction of the two slabs while at the same time preventing buckling or angular movement therebetween.

Although the above described "drilling method" of placing slip dowels has become popular, it will be appreciated that such method is extremely labor intensive. In fact, it takes approximately ten minutes to drill a ⅝" diameter by 12" long hole into the first pour and the drilling equipment, bits, accessories, and associated set up time tends to be very expensive. Moreover, the laborers who drill the holes and place the slip dowels must be adequately trained to insure that the dowels are arranged perpendicular to the joint but parallel to one another so as to permit the desired slippage during subsequent use.

The second popular method of placing slip dowels involves the use of wax treated cardboard sleeves positioned over one end of each individual dowel. According to such method, a series of holes are drilled through one edge of a concrete form and smooth dowels are advanced through each such hole. Was treated cardboard sleeves are placed over one end of each dowel and the first pour is made within the form. After the first pour has set, the previously drilled form is stripped away leaving the individual dowels extending into a neighboring open space where the second pour is to be made. Subsequently, the second pour is made and permitted to cure. Thereafter, the slip dowels will be firmly held by the concrete of the second pour but will be permitted to longitudinally slide against the inner surfaces of the wax treated cardboard sleeves within the first pour. Thus, the waxed cardboard sleeves facilitate longitudinal slippage of the dowels, while at the same time holding the two concrete slabs in a common plane, and preventing undesirable buckling or angular movement thereof.

This second method, while presently popular, is nonetheless associated with numerous deficiencies. For example, after the first pour has been made, the free ends of the dowels are likely to project as much as 18" through the forms and into the open space allowed for the second pour. Because the drilled section of form must be advanced over those exposed sections of dowel to accomplish stripping or removal of the form, it is not infrequent for the exposed portions of the dowels to become bent and, thus, nonparallel. Also, the drilled section of form may become damaged or broken during the removal process, thereby precluding its reuse.

It is unfortunate that both of the above described popular methods of placing slip dowels often result in the dowels being finally positioned at various angles rather than in the desired parallel array. When such occurs, the necessary slippage of the dowels is impeded or prevented.

In other applications wherein longitudinal slippage of the dowels is not desired, it is common to employ non-slip dowels or rebar disposed through two or more adjacent concrete pours. Because it is sometimes desirable to insert such non-slip dowels or rebar into a pre-poured and set concrete slab, it is further desirable to provide apparatus to facilitate insertion and or grouting in place of such rod, without the need for drilling or cutting of the existing concrete slab.

Accordingly, there remains a need in the art for methods and/or devices for facilitating the proper placement of slip dowels and non-slip dowels in various vertical and horizontal concrete applications.

SUMMARY OF THE INVENTION

In accordance with the present invention, there is provided a slip dowel placement sleeve comprising a generally cylindrical tube or sheath having a preferably open proximal end, a closed distal end and a generally hollow interior compartment. A perpendicular flange extends at least partially about the proximal end of the sheath. The flange is adapted to be rapidly mounted to a conventional form by suitable fasteners such as nails or staples whereby multiple sleeves may be disposed in an array upon the form. Accordingly, the slip dowel placement sleeves, when attached to the form extend outwardly from one side of the form, extending parallel into an open area where a first concrete pour is to be made. Thereafter, the first pour is completed and allowed to set. After the pour has set, the form is separated from the slip dowel placement sleeves and is removed, leaving the sleeves in place within the first pour. Multiple slip dowels having outside diameters slightly less than the inner diameter of the placement sleeves are then inserted into each slip dowel placement sleeve and permitted to extend therefrom into a neighboring space where a second pour is to be made. Thereafter the second pour is made and allowed to set. As a result, the portion of each slip dowel which extends into the second pour will be held firmly within the concrete of the second pour while that portion of each slip dowel which resides within the slip dowel placement sleeves of the first pour will be permitted to slip longitudinally due to the loose fit of the slip dowel rod within the placement sleeve. Accordingly, the slip dowels will prevent the cold joint between the two pours from buckling or undergoing angular movement while, at the same time permitting, longitudinal expansion and contraction of the pours.

Further, in accordance with the invention, the slip dowel placement sleeve may be configured with a slight proximal to distal end taper so as to facilitate extraction of the placement sleeve from the first concrete slab upon stripping of the form, thereby leaving an open cylindrical void within the slab. The resultant cylindrical void will be specifically sized to permit insertion and slidable movement of the slip dowels without the need for time consuming and expensive drilling operations. Also, the extraction of the placement sleeves will permit them to be reused, thereby lowering cost.

Still further in accordance with the invention, the dowel rod placement sleeves of the present invention may be specifically configured to accommodate and hold non-slip dowel rod or rebar. The dowel rod placement tube employed in such non-slip dowel applications will generally comprise a corrugated "grout tube" for facilitating placement of the non-slip dowel or rebar. In such embodiment, the "grout tube" will be generally in the configuration of the above described slip dowel placement sleeve and will in addition be provided with a series of annular ridges forming indentations i.e. an irregular surface along the outer surface of the sleeve, and also forming annular indentations or intrusions into the inner cavity of the sleeve. As such, each grout tube will remain firmly implanted within a surrounding concrete pour. Thereafter, textured dowel rod or rebar may be inserted inside the inner cavity of the sleeve with grouting material or other adhesive material or filler filling the space to firmly bond the bar within the sleeve. As the grouting material, adhesive or filler sets, the rebar or textured dowel will be firmly held within the grout tube in a non-slipping manner.

Still further in accordance with the invention, the dowel rod placement sleeve may be formed to include at least one pair of projections formed on the inner surface thereof, the projections being adapted to align the dowel rod within the interior compartment of the sleeve when the dowel rod is received therein. Additionally, a foot member may also be provided which is positionable about the outer surface of the placement sleeve adjacent the closed distal end thereof. The foot member is adapted to provide lateral support to the distal end of the placement sleeve thereby maintaining the sleeve in a generally horizontal orientation while concrete is being poured into the concrete slab form into which the sleeve extends.

Still further in accordance with the present invention, the dowel rod placement sleeve may be constructed so as to not have a flange formed about the proximal end thereof. In this respect, a sleeve having this particular configuration is used in conjunction with a plate member which includes a mandrel extending outwardly from one side thereof. The mandrel is sized and configured to be releasably receivable into the open proximal end and thus the hollow interior compartment of the sleeve. The placement sleeve is initially positioned upon the mandrel and the plate member attached to the form in the same manner as previously described with respect to the flange. After the concrete slab has been poured, the plate member, and hence the mandrel is removed from the interior compartment of the sleeve.

BRIEF DESCRIPTION OF THE DRAWINGS

These as well as other features of the present invention will become more apparent upon reference to the drawings wherein:

FIG. 1 is a perspective view of a preferred slip dowel placement sleeve of the present invention.

FIG. 2 is a perspective view of three separate preferred slip dowel placement sleeves of the present invention nailed to a section of wooden concrete form.

FIG. 3 is a cutaway view of a poured concrete slab abutted by a section of wooden concrete form and having a plurality of preferred slip dowel placement sleeves of the present invention extending thereinto.

FIG. 4 is a cutaway perspective view of a poured concrete slab having a plurality of slip dowel placement sleeves remaining therein following stripping away of a portion of the attendant concrete form.

FIG. 5 is a longitudinal sectional view of a cold joint formed between two poured concrete slabs with a slip dowel extending therethrough and positioned within a preferred slip dowel placement sleeve of the present invention.

FIG. 6 is an elevational view of a second preferred embodiment of the invention comprising an extractable slip dowel placement sleeve of tapered configuration.

FIG. 7 is a perspective view of a third preferred embodiment of the present invention comprising a corrugated "grout tube" for placement of non-slip dowel or rebar.

FIG. 8 is a longitudinal sectional view showing a cold joint between two poured concrete slabs, with a section of rebar extending therethrough and positioned within a corrugated "grout tube" of the present invention.

FIG. 9 is a partial perspective view of a preferred slip dowel placement sleeve of the present invention having a plurality of gussets extending between the proximal portion of the tubular sleeve and the perpendicularly attached rectangular flange to lend rigidity and support to the slip dowel placement sleeve during use.

FIG. 10 is a perspective view of a fourth preferred embodiment of the present invention, wherein the placement sleeve includes projections formed within the interior compartment thereof.

FIG. 11 is a perspective view of two separate slip dowel placement sleeves of the fourth embodiment of the present invention as nailed to a section of a wooden concrete form.

FIG. 12 is a cutaway view of the slip dowel placement sleeve illustrated in FIG. 10, illustrating the manner in which the projections serve to align a dowel rod disposed within the interior compartment.

FIG. 13 is a perspective view of a fifth preferred embodiment of the present invention, wherein a foot member is disposed on the distal end of the slip dowel placement sleeve.

FIG. 14 is a perspective view of the foot member illustrated in FIG. 13.

FIG. 15 is a partial cutaway view of a sixth preferred embodiment of the present invention, comprising a plate member which is releasably receivable into a flangeless slip dowel placement sleeve.

FIG. 16 is a perspective view of the plate member illustrated in FIG. 15.

DETAILED DESCRIPTION OF THE PREFERRED EMBODIMENT

The accompanying drawings are provided for purposes of illustrating presently preferred embodiments of the invention and are not intended to limit the scope of the invention in any way.

Referring now to the drawings, FIGS. 1 through 5 pertain to the basic slip dowel placement sleeve of the present invention, while FIGS. 6 through 9 pertain to additional embodiments wherein various additions, modifications, and/or alterations have been made to the basic sleeve shown in FIGS. 1-5 for the purposes of further facilitating its utility and/or permitting the use of non-slip dowel or rebar within a "grout tube" application.

As shown in FIG. 1, the basic slip dowel placement sleeve 10 of the invention comprises a generally cylindrical dowel receiving sheath 12 having a closed distal end 14, a preferably open proximal end 16, and a hollow interior compartment formed therewithin. A generally rectangular flange 18 extends perpendicularly about the proximal end 16 of the sheath 12. A central aperture is formed in the flange 18 so as to permit passage of a dowel rod through the flange and into the open inner compartment of the sheath 12. Plural apertures 20, 22, 24, and 26 are formed near each corner of the flange 18 to permit nailing or stapling of the flange to the surface of a wooden concrete form or other surface. Preferably, the sleeve 10 is integrally formed of a plastic material fabricated by conventional molding techniques.

The manner in which the basic slip dowel positioning sleeves 10 are employed is illustrated in FIGS. 2 through 5. As shown, a series of individual slip dowel placement sleeves 10A, 10B, 10C, and 10D are positioned and affixed in an array along the inner surface of a section of wooden concrete form 30 such that each individual sleeve 10A, 10B, 10C, 10D extends perpendicularly from the inner surface of the form 30 in substantially parallel disposition.

The attachment of the dowel rod placement apparatus, 10A, 10B, 10C, 10D to form 30 is made by passing staples or small head nails through the apertures 20, 22, 24, 26 of flanges 18A-D. Thereafter, the form 30 is held firmly in position by stakes 32, 34. A first concrete pour is made within the form 30 so as to form first concrete slab 36. After slab 36 is set, the form 30 is stripped away, separating the individual flanges, 18A-D and their associated nail or staple fasteners from the inner surface of the form 30. Such stripping away of the form 30 leaves the individual dowel rod positioning sleeves 10A-D in a parallel array within the slab 36 while the proximal flanges 18A-D thereof reside flush with the formed edge 38 of slab 36.

Sections of smooth dowel 40, 41, 42 are then inserted through apertures located in flanges 18A-D and advanced distally into the longitudinal inner cavities of the dowel receiving sheaths of sheaves 10A-D. The portion of the dowel rods 40, 41, 42 advanced into the sleeves 10A-D will remain slidably disposed therein while the remaining portion of dowel rods 40, 41, 42 extend outwardly into an adjacent space 46 wherein a second concrete pour is to be made.

Thereafter, concrete is poured into space 46 in a conventional manner and allowed to set, thereby forming a second concrete slab 48. A cold joint or seam 50 extends between the first slab 36 and the second slab 48. Through use of the dowel rod positioning sleeves 10A-D of the present invention, the dowel rods 40, 41, 42 remain parallel to one another and longitudinally slidable within the first slab 36 while being firmly cured in place within second slab 48. By such arrangement, the individual first 36 and second 48 slabs are permitted to undergo longitudinal expansion and contraction along the dowels 40, 41, 42 while at the same time being prevented from buckling or undergoing vertical or angular displacement at the cold joint 50.

Many modifications, alterations and/or additions may be made to the basic slip dowel positioning apparatus 10. Several such modifications, alterations and additions are illustrated in FIGS. 6 through 9. Referring specifically to FIG. 6, the slip dowel positioning apparatus of the present invention may be configured so as to be "strippable" or extractable from the first concrete pour, thereby leaving an open cylindrical void within the first concrete slab, so as to permit insertion of the desired dowel rods without requiring continued presence of the dowel rod positioning apparatus.

The extractable or "strippable" positioning apparatus 100 of the invention differs from the basic positioning apparatus 10 in that the outer surface of the dowel receiving sheath 120 of the extractable apparatus 100 is distally tapered such that the distal end 140 thereof is smaller than the proximal end 160. The proximal flange 180 of the extractable apparatus 100 is structurally the same as that of the basic apparatus 10 described in FIG. 1. However, the provision of the tapered sheath 120 permits the extractable apparatus 100 to be pulled out of the first concrete slab automatically upon stripping of the form from the slab, thereby leaving an open cylindrical void within the slab. The extracted apparatus 100 may then be reused in subsequent concrete pours.

Another modified embodiment of the invention shown in FIG. 7 comprises a corrugated or ribbed non-slip dowel positioning apparatus or "grout tube" intended for use with textured dowel or rebar in applications where longitudinal slippage of the bar is not desired. Specifically, referring to FIG. 7 the corrugated or ribbed "grout tube" 200 comprises a corrugated sheath 220 having a closed distal end 240 and an open proximal end 260 with a flange 280 positioned on the proximal end 260 in a manner substantially identical to that of the basic apparatus 10. However, this "grout tube" embodiment 200 differs from the basic placement sleeve 10 in that the sheath 220 of the "grout tube" is provided with a multiplicity of annular ribs 282 upon the outer surface of the sheath 220 and further forming indentations within the inner cavity thereof. Such corrugated or ribbed construction firmly holds the "grout tube" in a set position within the center of a concrete slab 360. A section of rebar 400 is inserted into the inner cavity of the apparatus with a quantity of conventional grouting material 402 being applied so as to fill the space therewithin. As the grouting material 402 hardens it serves to hold the rebar 400 firmly in place within the "grout tube" 200. The remaining portion of the rebar 400 extends into an adjoining open area where it becomes set within a poured second slab 480 such that the rebar will be firmly held within first slab 360 by way of the grouting material 402 and grout tube while the opposite end of the rebar is firmly held within a second poured concrete slab. By such arrangement, the first and second concrete slabs 360 and 480 are prevented from moving longitudinally as well as angularly along cold joint 500.

A further modification of the basic device which is contemplated by the invention is the provision of fins or gussets 60 as shown in FIG. 9. Such fins or gussets are of generally triangular configuration and extend between the proximal end 16 of the tubular sheath 12 and the inner surface of flange 18 so as to impart additional strength and rigidity to the apparatus. Of course, various other types of fins, gussets, supports, or braces may be employed and, such fins need not be limited to the triangular configurations shown in FIG. 9.

Another modified embodiment of the invention shown in FIG. 10 comprises a dowel placement apparatus adapted to maintain the dowel rod in alignment therewithin. Specifically, referring to FIG. 10, the placement apparatus 600 comprises a generally cylindrical dowel receiving sheath 602 having a closed distal end 604, an open proximal end 606, and a hollow interior compartment 608 defined by inner surface 610 of receiving sheath 602. A generally rectangular flange 612 extends perpendicularly about the proximal end 606 of sheath 602. As described with respect to previous embodiments, a central aperture is formed in the flange 612 to permit passage of a dowel rod through the flange 612 and into the open interior compartment 608 of the sheath 602. Additionally, as also previously described, plural apertures 614, 616, 618, 620 are formed near each corner of the flange 612 to permit nailing or stapling of the flange 612 to the surface of a wooden concrete form 622 or other surface as seen in FIG. 11. Preferably, the placement apparatus 600 is integrally formed of a plastic material fabricated by conventional molding techniques.

Referring now to FIGS. 10 and 12, formed upon inner surface 610 of sheath 602 are projections 624 which are disposed within interior compartment 608 in opposed pairs. Advantageously, projections 624 are adapted to align a dowel rod 626 within interior compartment 608 when the dowel rod 626 is received therein. As shown in FIGS. 10 and 12, receiving sheath 602 includes two pairs of projections 624 disposed therewithin. It will be appreciated, however, that additional pairs of projections 624 may be included. Additionally, receiving sheath 602 is illustrated as being distally tapered in the same manner as described with respect to a previous embodiment. In this regard, the distal end 604 is smaller than the proximal end 606. As previously specified, this distally tapered configuration facilitates the extraction of placement apparatus 600 from within a concrete slab. It will be appreciated, however, that placement apparatus 600 may have a non-tapered configuration as previously described with respect to the basic placement sleeve 10 in the first embodiment.

Another modified embodiment of the invention shown in FIG. 13 comprises a dowel rod placement apparatus which includes a lateral support member. Specifically, referring to FIG. 13, placement apparatus 700 comprises a receiving sheath 702 having a closed distal end 704, an open proximal end 706 and an outer surface 708. Placement apparatus 700 further includes a flange 710 positioned on the proximal end 706 in a manner identical to that as described in previous embodiments. Placement apparatus 700 further comprises a foot member 712 which is perspectively illustrated in FIG. 14. Foot member 12, which preferably has a rectangular configuration, defines an aperture 714 extending therethrough. Importantly, aperture 714 is sized and configured to slidably receive the distal end 704 of receiving sheath 702 such that foot member 712 may be positionable about the outer surface 708 of sheath member 702 adjacent the distal end 704 thereof. Preferably, placement apparatus 700 is formed of a plastic material fabricated by conventional molding techniques.

In this particular embodiment, foot member 712 is adapted to provide lateral support to receiving sheath 702 when flange 710 is affixed to the surface of a wooden concrete form or other surface. In this respect, foot member 712 is operable to prevent receiving sheath 702 from being deflected and subsequently positioned within the finished concrete slab in a downwardly angled orientation as a result of the force of the concrete against outer surface 708 as the concrete slab is being poured. As can be appreciated, receiving sheath 702 is preferably maintained in a horizontal orientation for the proper operation of the placement apparatus 700. As shown in FIG. 13, receiving sheath 702 is shown having a distally tapered configuration wherein the distal end 704 is smaller than the proximal end 706. Once again, it will be appreciated that the receiving sheath 702 of placement apparatus 700 may also have a non-tapered configuration. Additionally such a foot member may be used in conjunction with all embodiments of the present invention previously or hereinafter described.

Another modified embodiment of the invention shown in FIGS. 15 and 16 comprises a dowel placement apparatus which includes two independent components. Specifically, referring to FIG. 15, the placement apparatus 800 comprises a receiving sheath 802 having a closed distal end 804, an open proximal end 806 and an interior compartment 808 defined by inner surface 810. Importantly, the receiving sheath 802 does not include a flange positioned on the proximal end 806 thereof. In this respect, included as part of placement apparatus 800 is a plate member 812 which defines an inner surface 814 and an outer surface 816. Extending perpendicularly outwardly from inner surface 814 is a mandrel 818 which is sized and configured to be releasably receivable into interior compartment 808.

As can be appreciated, plate member 812 functions in substantially the same manner as the flanges as described with respect to previous embodiments. In this regard, plate member includes apertures 820, 822, 824, 826 formed near each corner thereof to permit nailing or stapling of the plate member 812 to the surface of a wooden concrete form or other surface. After plate member 812 has been affixed to the form in a manner wherein outer surface 816 is abutted thereagainst, receiving sheath 802 is placed upon mandrel 818 in the manner shown in FIG. 15. A concrete slab is then poured about receiving sheath 802 in the same manner as previously described. Thereafter, since plate member 812 is not an integral part of receiving sheath 802, plate member 812 is removed from receiving sheath 802 by pulling mandrel 818 out from within interior compartment 808. Thus, the placement apparatus 800 of this particular embodiment allows plate member 812 to be utilized in subsequent slab forming operations. Preferably, placement apparatus 800 is formed of a plastic material fabricated by conventional molding techniques. Additionally, though mandrel 818 is shown as having a generally cylindrical configuration, it will be appreciated that other configurations may be utilized.

Although several possible additions, modifications and alterations of the basic invention have been described herein, it must be appreciated that many more additions, modifications and alterations will likely be apparent to those skilled in the art. Accordingly, it is intended that all such conceivable additions, alterations and modifications be included within the scope of the following claims and the equivalents thereof.

What is claimed is:

1. A concrete dowel placement apparatus comprising:
   a dowel receiving sheath comprising a generally tubular body having an outer surface, an open proximal end, a closed distal end and an inner surface defining a hollow interior compartment extending axially therein, said interior compartment being sized and configured to slidably receive therein a dowel rod of predetermined size and to permit said dowel rod to remain longitudinally slidable as it resides within said interior compartment;
   at least one pair of projections formed on said inner surface, said projections being adapted to align said dowel rod within said interior compartment when said dowel rod is received therein; and
   means for connecting said dowel receiving sheath to a generally flat surface such that said open proximal end of said sheath will abut said generally flat surface and said tubular body of said sheath will extend away from said generally flat surface.

2. The concrete dowel placement apparatus of claim 1 wherein said means for connecting said dowel receiving sheath to said generally flat surface comprises:
   at least one flange formed on said proximal end of said sheath and extending perpendicularly thereto, said flange being configured such that nails may be passed through said flange and into an underlying flat surface, thereby forming a firm connection between said dowel receiving sheath to said underlying flat surface.

3. The concrete dowel placement apparatus of claim 2 wherein said flange is a generally rectangular plate formed on said proximal end of said dowel receiving sheath and wherein said flange is provided with an aperture extending therethrough so as to permit passage of said dowel rod through said aperture and into said interior compartment of said dowel receiving sheath.

4. The concrete dowel positioning apparatus of claim 1 wherein said outer surface of said dowel receiving sheath is tapered such that said distal end thereof is smaller than said proximal end thereof, thereby facilitating extraction of said placement apparatus from a concrete slab.

5. The concrete dowel positioning apparatus of claim 2 further comprising at least one strength imparting gusset extending between a proximal portion of said dowel receiving sheath and an inner surface of said perpendicular flange.

6. The concrete dowel placement apparatus of claim 1 wherein said apparatus is formed of molded plastic.

7. The concrete dowel placement apparatus of claim 1 wherein said closed distal end of said dowel receiving sheath comprises a non-removable end closure.

8. A concrete dowel placement apparatus comprising:
   a dowel receiving sheath comprising a generally tubular body having an outer surface, an open proximal end, a closed distal end and a hollow interior compartment extending axially therein;
   a foot member, said foot member being slidably positionable about said outer surface of said sheath adjacent said closed distal end thereof, said foot member being adapted to support said dowel receiving sheath; and
   a flange extending perpendicularly about said open proximal end of said sheath, said flange being formed to extend completely about said open proximal end and having an inner surface and a generally flat outer surface, wherein said outer surface of said flange is held in abutting contact with a flat surface of a concrete form to prevent seepage of concrete into said hollow interior compartment of said sheath.

9. The concrete dowel placement apparatus of claim 8 wherein
   a plurality of apertures are formed in said flange, said apertures being sized, configured and positioned to permit passage of nails therethrough in such a manner as to facilitate nailing of said flange to said flat surface of said concrete form such that said flat outer surface of said flange is held in abutting contact with said flat surface of said form.

10. The concrete dowel placement apparatus of claim 8 wherein said flange has a generally rectangular configuration.

11. The concrete dowel placement apparatus of claim 8 wherein said interior compartment of said dowel receiving sheath is sized and configured to slidably receive therein a dowel rod of predetermined size and to permit said dowel rod to remain longitudinally slidable as it resides within said interior compartment of said sheath.

12. The concrete dowel positioning apparatus of claim 8 wherein said outer surface of said dowel receiving sheath is tapered such that said distal end thereof is smaller than said proximal end thereof, thereby facilitating extraction of said apparatus from a concrete slab.

13. The concrete dowel positioning apparatus of claim 8 further comprising at least one strength imparting gusset extending between a proximal portion of said dowel receiving sheath and an inner surface of said perpendicular flange.

14. The concrete dowel placement apparatus of claim 8 wherein said apparatus is formed of molded plastic.

15. The concrete dowel placement apparatus of claim 8 wherein said closed distal end of said dowel receiving sheath comprises a non-removable end closure.

16. A concrete dowel placement apparatus comprising:
- a dowel receiving sheath comprising a generally tubular body having an outer surface, an open proximal end, a closed distal end and a hollow interior compartment extending axially therein;
- a foot member, said foot member being positionable about said outer surface of said sheath adjacent said closed distal end thereof, said foot member being adapted to support said dowel receiving sheath;
- a generally rectangular flange extending perpendicularly about said open proximal end of said sheath, said flange being formed to extend completely about said open proximal end and having an inner surface and a generally flat outer surface, wherein said outer surface of said flange is held in abutting contact with a flat surface of a concrete form to prevent seepage of concrete into said hollow interior compartment of said sheath; and
- at least one strength imparting gusset extending between a proximal portion of said outer surface of said sheath and said inner surface of said flange.

17. The concrete dowel placement apparatus of claim 16 wherein a plurality of apertures are formed in said flange, said apertures being sized, configured and positioned to permit passage of nails therethrough in such a manner as to facilitate nailing of said flange to said flat surface of said concrete form such that said flat outer surface of said flange is held in abutting contact with said flat surface of said form.

18. The concrete dowel placement apparatus of claim 16 wherein said interior compartment of said dowel receiving sheath is sized and configured to permit a dowel rod to be slidably inserted therein and to allow said dowel rod to remain longitudinally slidable therewithin so long as said dowel rod resides within said interior compartment of said sheath.

19. The concrete dowel placement apparatus of claim 16 wherein said apparatus is formed of molded plastic.

20. The concrete dowel placement apparatus of claim 16 wherein said closed distal end of said dowel receiving sheath comprises a non-removable end closure.

21. A concrete dowel placement apparatus comprising:
- a dowel receiving sheath comprising a generally tubular body having an outer surface, an open proximal end, a closed distal end and a hollow interior compartment extending axially therein; and
- a plate member defining an inner surface and an outer surface wherein said inner surface includes a mandrel formed on and extending perpendicularly therefrom, said mandrel being sized and configured to be releasably receivable into said hollow interior compartment by way of said open proximal end of said receiving sheath and said outer surface having a generally flat configuration so as to be placeable into abutting contact with a flat surface of a concrete form.

22. The concrete dowel placement apparatus of claim 21 wherein said plate member has a generally rectangular configuration and includes a plurality of apertures formed therein, said apertures being sized, configured and positioned to permit passage of nails therethrough in such a manner as to facilitate nailing of said plate member to said flat surface of said concrete form such that said flat outer surface of said plate member is held in abutting contact with said flat surface of said form.

23. The concrete dowel placement apparatus of claim 21 wherein said interior compartment of said dowel receiving sheath is sized and configured to slidably receive therein a dowel rod of predetermined size when said mandrel is removed therefrom, and to permit said dowel rod to remain longitudinally slidable as it resides within said interior compartment of said sheath.

24. The concrete dowel positioning apparatus of claim 21 wherein said outer surface of said dowel receiving sheath is tapered such that said distal end thereof is smaller than said proximal end thereof, thereby facilitating extraction of said sheath from a concrete slab.

25. The concrete dowel positioning apparatus of claim 21 wherein said dowel receiving sheath and said plate member are formed of molded plastic.

26. The concrete dowel positioning apparatus of claim 2 wherein said closed distal end of said dowel receiving sheath comprises a non-removable end closure.

27. The concrete dowel positioning apparatus of claim 21 wherein said mandrel has a generally cylindrical configuration.

28. A concrete dowel placement apparatus comprising:
- a dowel receiving sheath comprising a generally tubular body having an outer surface, an open proximal end, a closed distal end and a hollow interior compartment extending axially therein; and
- a flange extending perpendicularly about said open proximal end of said sheath, said flange being formed to extend completely about said open proximal end and having an inner surface and a generally flat outer surface, wherein said outer surface of said flange is held in abutting contact with a flat surface of a concrete form to prevent seepage of concrete into said hollow interior compartment of said sheath.

29. The concrete dowel placement apparatus of claim 28 wherein said flange has a generally rectangular configuration.

30. The concrete dowel placement apparatus of claim 28 wherein a plurality of apertures are formed in said flange, said aperture as being sized, configured and positioned to permit passage of nails therethrough in such a manner as to facilitate nailing of said flange to said flat surface of said concrete form such that said flat outer surface of said flange is held in abutting contact with said flat surface of said form.

31. The concrete dowel placement apparatus of claim 28 wherein said interior compartment of said dowel receiving sheath is sized and configured to permit a dowel rod to be slidably inserted therein and to allow said dowel rod to remain longitudinally slidable therewithin so long as said dowel rod resides within said interior compartment of said sheath.

32. The concrete dowel placement apparatus of claim 28 wherein said apparatus is formed of molded plastic.

33. The concrete dowel placement apparatus of claim 28 wherein said closed distal end of said dowel receiving sheath comprises a non-removable end closure.

34. The concrete dowel placement apparatus of claim 28 further comprising at least one strength imparting gusset extending between a proximal portion of said outer surface of said sheath and said inner surface of said flange.

35. A concrete dowel placement apparatus comprising:
a dowel receiving sheath comprising a generally tubular body having an outer surface, an open proximal end, a closed distal end and a hollow interior compartment extending axially therein; and a flange extending perpendicularly about said open proximal end of said sheath, said flange being formed to extend completely about said open proximal end and having an inner surface and an outer surface, wherein said outer surface of said flange is held in abutting contact with a flat surface of a concrete form to prevent seepage of concrete into said hollow interior compartment of said sheath.

* * * * *